United States Patent [19]

Hussain

[11] Patent Number: 4,934,195
[45] Date of Patent: Jun. 19, 1990

[54] CORIOLIS MASS FLOWMETER

[75] Inventor: Yousif A. Hussain, Coulsdon, United Kingdom

[73] Assignee: The Foxboro Company, Foxboro, Mass.

[21] Appl. No.: 287,199

[22] PCT Filed: Jun. 2, 1987

[86] PCT No.: PCT/GB87/00378
§ 371 Date: Jan. 24, 1989
§ 102(e) Date: Jan. 24, 1989

[87] PCT Pub. No.: WO87/07714
PCT Pub. Date: Dec. 17, 1987

[30] Foreign Application Priority Data

Jun. 10, 1986 [GB] United Kingdom ............... 8614135

[51] Int. Cl.$^5$ ............................................. G01F 1/84
[52] U.S. Cl. ................................................. 73/861.38
[58] Field of Search ........................ 73/861.37, 861.38

[56] References Cited

U.S. PATENT DOCUMENTS 4,491,025 1/1985 Smith et al. ................... 73/861.38
4,660,421 4/1987 Dahlin et al. .................. 73/861.38

FOREIGN PATENT DOCUMENTS 0109218 5/1984 European Pat. Off. .
0119638 9/1984 European Pat. Off. .
W000699 1/1986 PCT Int'l Appl. .

OTHER PUBLICATIONS

"Measuring Mass Flow Using Vibrating Tubes", in Engineering Materials & Design, V29 (85), Mar., #3, p. 25.
"atp-Marktanalyse Durchflussmesstechnik", in Automatisierungstechnische Praxis atp., 4/86, pp. 169–178.

Primary Examiner—Herbert Goldstein
Attorney, Agent, or Firm—Fish & Richardson

[57] ABSTRACT

In a coriolis mass flowmeter a flexible tube structure for carrying the fluid to be measured comprises parallel tubes (1, 2) fixed at (7, 8) and formed with loops (5, 6). Electromagnetic means vibrate the loops in their own planes in directions normal to arms A, B of the tubes setting up torques on the loops sensed by two sensor pair (14, 15). The signals from the two sensors are used to measure the mass flow rate (since the later is proportional to the time phase-shift of these signals). Also the signals are used to drive and control the driving device for the electromagnetic means.

14 Claims, 5 Drawing Sheets

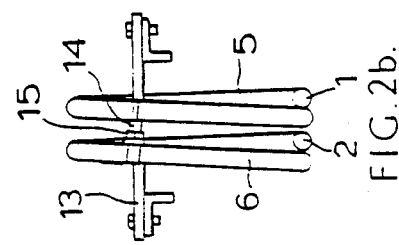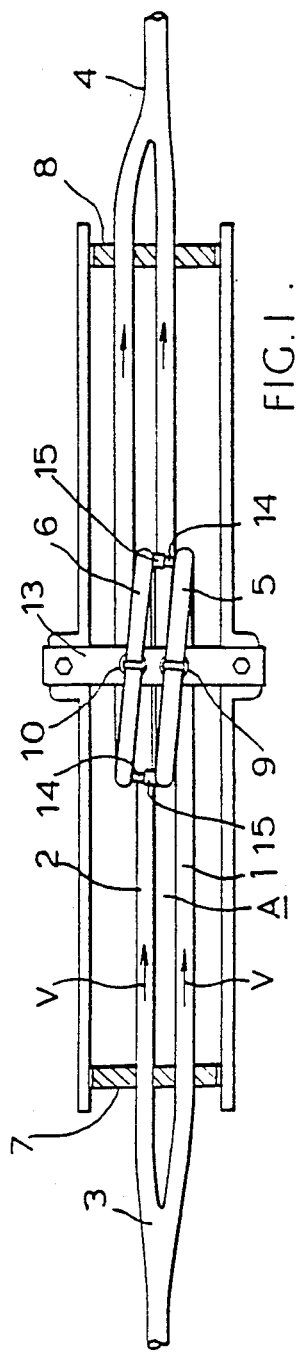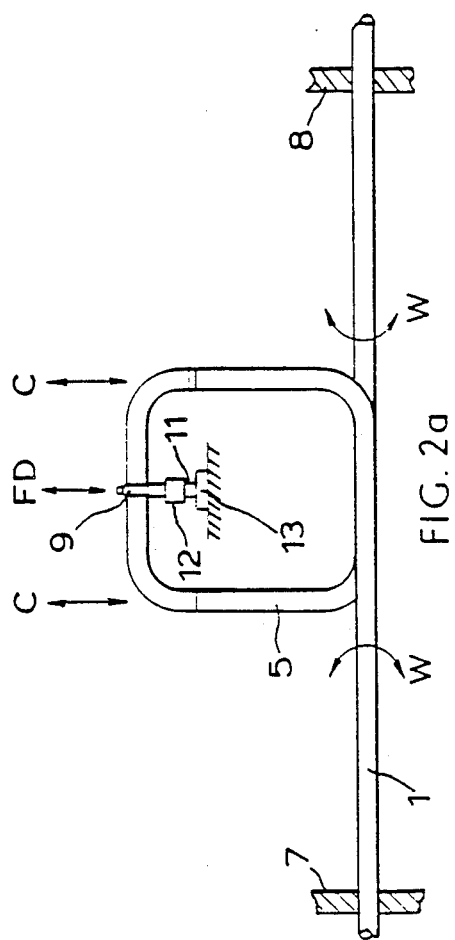

CORIOLIS MASS FLOWMETER

FIELD OF THE INVENTION

This invention relates to coriolis mass flowmeters that can advantageously be used industrially.

DESCRIPTION OF THE PRIOR ART

A coriolis force is defined as a velocity dependent force that apparently arises when the motion of object is reckoned with respect to a rotating coordinate system and mass flowmeters involving this principle are known and commercially available.

OUTLINE OF THE INVENTION

An object of the present invention is to provide a tube structure carrying the fluid to be measured arranged in such a way that the forces arising in the operation of the meter enable the structure to have reduced stiffness and consequently reduced risk of fatigue failure and economy in the power required to operate the meter.

According to the present invention a coriolis mass flowmeter comprising substantially parallel tubes for fluid of which the mass flow is to be measured when passing in the same direction therethrough; first means for adapting said tubes at one end thereof jointly to receive said fluid to pass therethrough; second means for adapting said tubes at the other end thereof jointly to deliver said fluid after passing therethrough, each said tube being formed between its ends with a loop from which two arms, constituting portions of said tube, extend respectively to said first and second means, means remote from said loops holding said arms fixed in the flowmeter, characterized in that each loop lies substantially wholly in a flat plane and means are provided for vibrating said loops respectively in the areas of the planes thereof while said planes remain substantially fixed and with equal frequency in opposite phases whereby coriolis forces are experienced by said arms, said arms being flexible between said loops and said first and second means and said vibrations being such as to exert vibratory torques on said loops in their respective planes, the torques having a phase-shift dependent on the mass of said fluid when passing through said tubes and sensing means responsive to said phase-shift for providing a measurement signal corresponding to the mass flow of said fluid through said tubes.

DESCRIPTION OF THE DRAWINGS

In order that the invention may be clearly understood and readily carried into effect, coriolis mass flowmeters in accordance therewith will now be described, by way of example, with reference to the accompanying drawings, in which:

FIG. 1 is a plan of a mechanical assembly in a coriolis mass flowmeter;

FIGS. 2a, 2b are side and end elevations of the assembly of FIG. 1;

FIGS. 1, 2a, 2b show a tube configuration comprising two identical lengths 1, 2 of tube having a circular cross-section throughout. Inlet ends of these tubes merge at 3 to receive the fluid whose mass flow is to be measured. At their opposite ends the tubes merge at 4 for the discharge of the fluid.

Figure 3A:
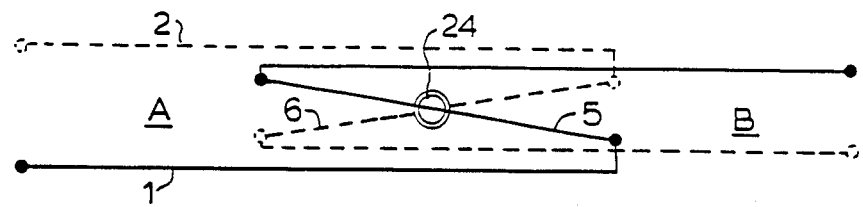
FIGS. 3a, 3b and 3c show very diagrammatically plan, side and end elevations of a modification of the arrangement shown in FIGS. 1 and 2.

The central portion of each tube is folded back on itself to form a rectangular loop 5, 6 with rounded corners. The tubes 1, 2 are parallel and the similar loops 5, 6 are juxtaposed as shown in FIG. 1 with arms A and B projecting in opposite directions therefrom. The ends of the tubes 1, 2 are rigidly mounted in frame members 7, 8 upstream and downstream of the loops 5, 6 so that when the loops are vibrated as described below, the tubes are vibrated at their resonant frequency in the planes of the loops.

The vibration of the loops 5, 6 is in opposite phase so that one moves up as the other moves down. This is effected by electromagnets 9, 10 allocated respectively to the loops and designed to provide sufficient amplitude of oscillation to vibrate the tubes in a flexural mode. In each electromagnet a pole piece 11 is made from annealed low carbon steel which allows a high flux density without saturation to provide a sufficient field strength and is fixed to a cross-bar 13. The associated coils 12 which are mounted on pole pieces 11 in vertical alignment with these pole pieces 11 each have 776 turns of 28 AGW wire.

Figure 5:
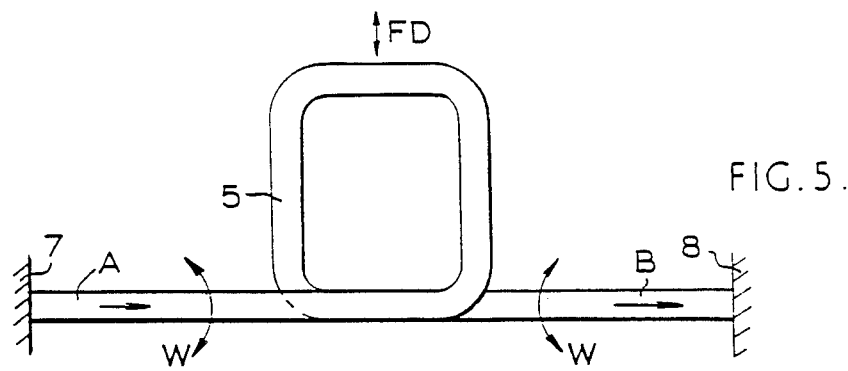
FIGS. 5, 6 and 7 are explanatory diagrams.
Figure 6:
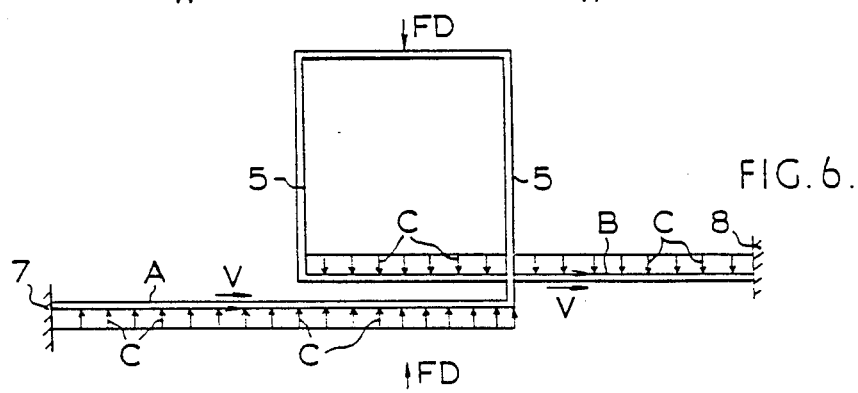
Figure 7:
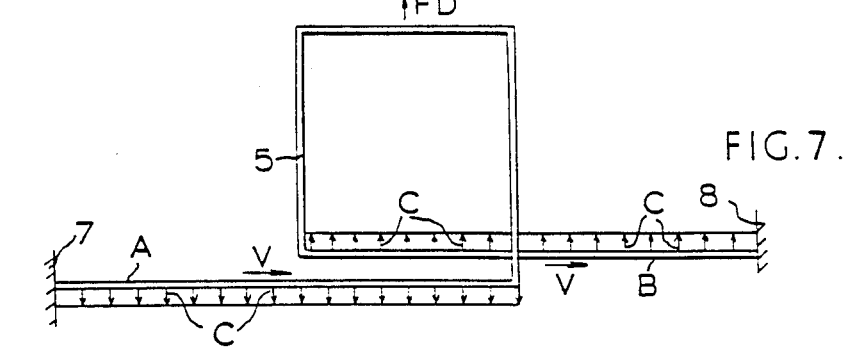

In operation, when a mass of fluid is flowing in the direction of the arrows V, coriolis forces C are set up in the arms A, B as shown in FIGS. 6 and 7. These are due to the oscillatory rotation W (FIG. 5) of these arms which is achieved by the reciprocating driving forces FD of the electromagnets 9, 10. When the force FD due to one electromagnet is in one direction (FIG. 6) the coriolis force C on the arm B of the associated loop is enhancing the driving force while the coriolis force C on the arm A is opposing the driving force. With the force FD due to the electromagnet in the opposite direction (FIG. 7) the coriolis force C in the arm B is again enhancing the driving force while the coriolis force on the arm A is again opposing the driving force. This tends to slow down the deflection of the arm A while accelerating the deflection of the arm B. Because the electromagnets 9, 10 are 180° out of phase the corresponding actions of their pairs A, B of arms are out of phase and a time phase shift is developed between the pairs of arms. The mass flowrate of the flowing fluid is detected by measuring the time phase shift between two sensors as described below. When the mass flowrate of the flowing fluid varies this phase shift varies and the variation can be recorded.

Each of the aforementioned sensors comprises a double pole permanent magnet 14 mounted on a vertical limb of one coiled pipe and a search coil 15 facing the magnet, the search coil being on the corresponding vertical limb of the other coiled pipe, the second vertical limb of which carries the permanent magnet 14 of the second sensor facing a search coil on the first coil. Each coil 15 has 400 turns of 30 AWG wire.

The electromagnets 9, 10 for vibrating the loops 5 are driven in phase with the output of the sensor coils 15 by feedback connections 16 (FIG. 4) an amplifier 17, an automatic gain controller 18 and a power amplifier 19.

The mass flow measurement signal is derived by detecting the time phase shift between the sensors. For this purpose each of the sensor coils 15 is connected by its own gain amplifier 20 and zero crossing comparator 21 to a common arrangement of gates 22 feeding an integrator 23.

Figure 4:
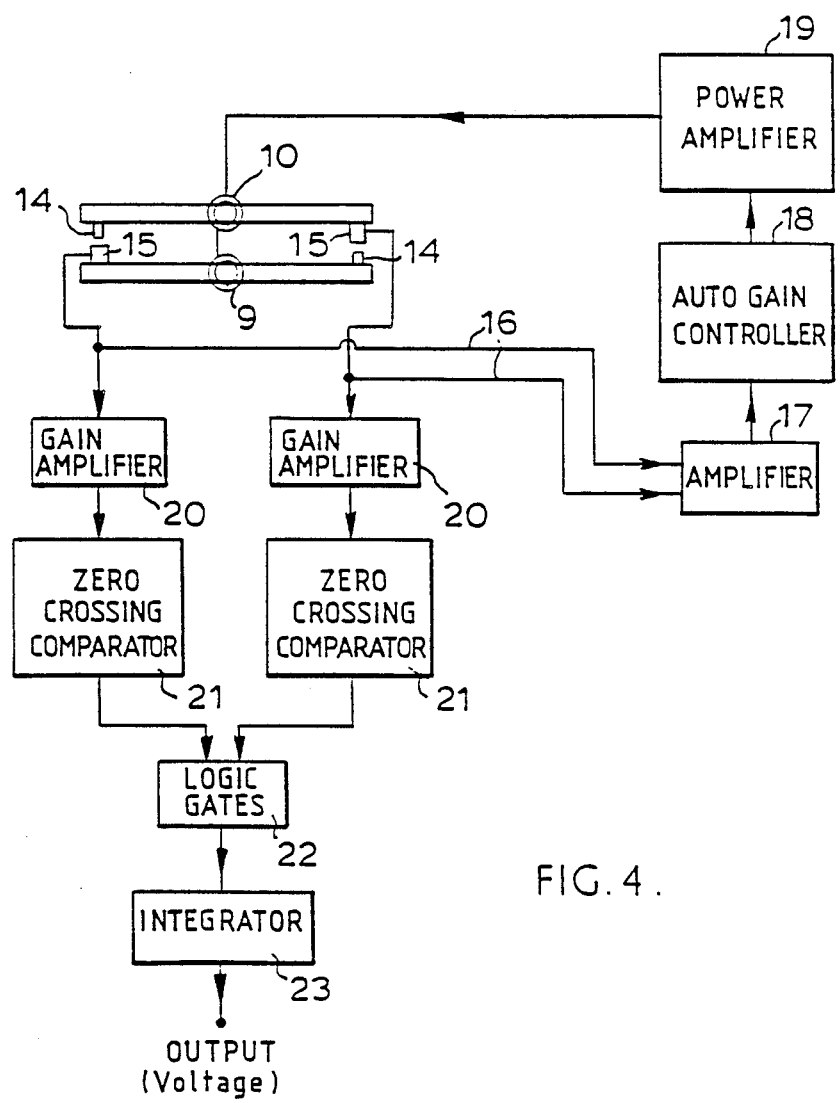
FIG. 4 is a block diagram showing an electronic circuit for use with the assemblies of FIGS. 1 to 3c.

The various electronic units shown in FIG. 4 are believed to be very well known to those skilled in the art and so do not need any further elucidation in this specification.

Figure 3B:
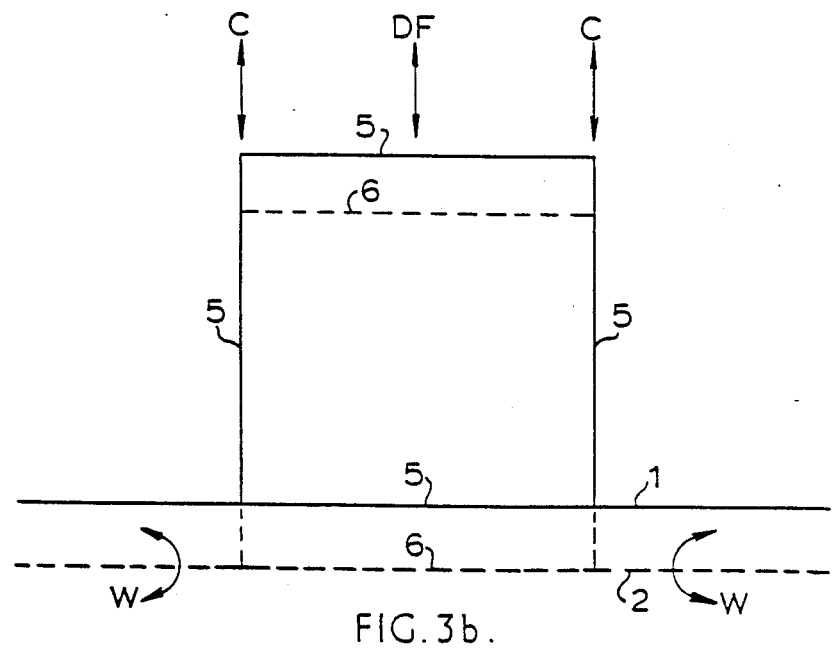
Figure 3C:
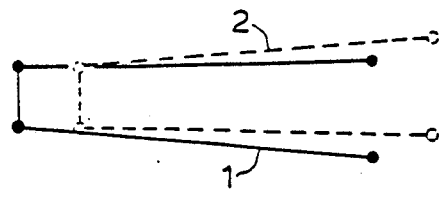

FIGS. 3a to 3c show very diagrammatically an alternative configuration of tubes using the same principle as in FIGS. 1 to 2b, corresponding reference numerals being used in this alternative. An advantage of this design is that only one driving coil 24 is needed for the two loops and the pole pieces are fixed directly to the loops at the point where the loops cross over with the coil between them so that no cross-bar is required with consequent reduction in the effect of frame vibration. Alternating voltage applied to the coil 24 cause the pole pieces to separate raising one loop while depressing the other and then to approach one another depressing the first loop and simultaneously raising the second.

In another modification the two tubes are merged into one another before they meet the supporting frame members 7, 8 which are then spaced further apart, thereby cancelling or minimizing vibration before it is transmitted to the frame of the instrument.

In a further modification each loop is circular.

Figure 8:
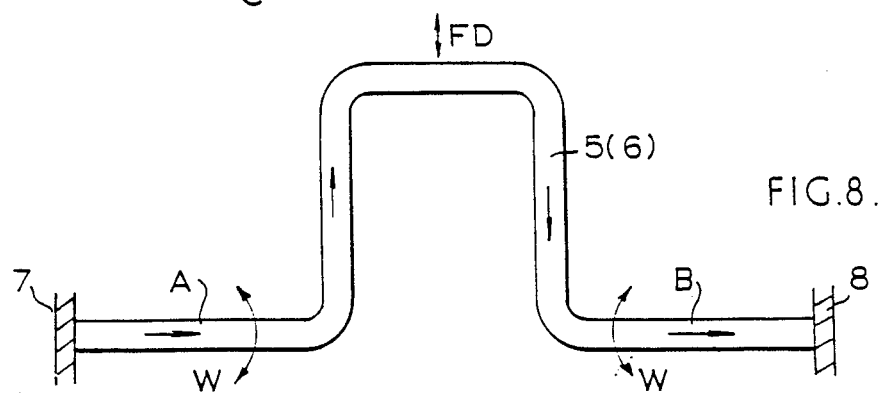
FIG. 8 is a diagram showing a modification of the assembly of FIGS. 1, 2a, 2b.

In yet a further modification shown in FIG. 8, each loop 5, 6 is not closed but is open between the associated coaxial arms A, B. The required reversal of momentum of the fluid in relation to the reciprocation of the driving force FD still results from this arrangement.

Figure 9:
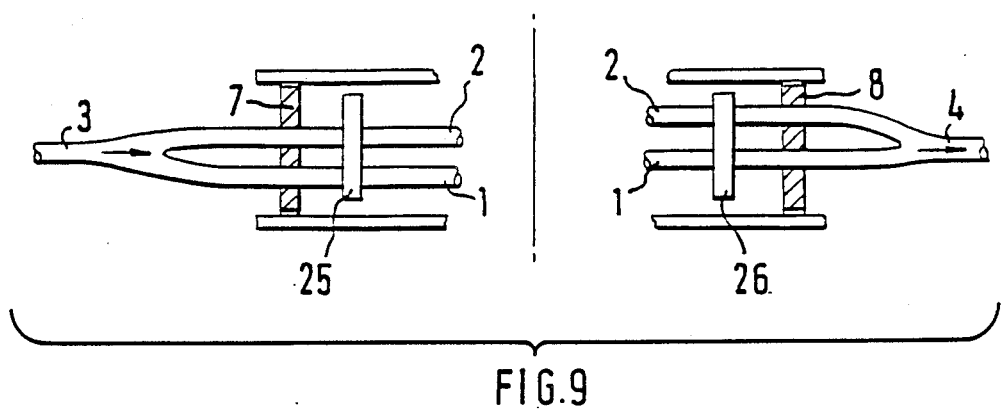
FIG. 9 is a diagram showing a further modification of the assembly of FIGS. 1, 2a, 2b.

FIG. 9 shows a modification in which a node plate 25 is fixed to the inputs of the tubes 1, 2 just ahead of the frame member 7 and a node plate 26 is fixed to the outputs of the tubes 1, 2 just before the frame member 8. These node plates 25, 26 are located a few diameters from the respective frame members 7, 8. One advantage of these node plates is that they maintain the resonant energy between the two loops. A second advantage is that they reduce the effect of vibration and noise to and from the meter. A third advantage is that they reduce the bending stresses at the joints between the pipes and frame members 7, 8.

I claim:

1. A coriolis mass flowmeter comprising substantially parallel tubes for fluid of which the mass flow is to be measured when passing in the same direction therethrough; first means for adapting said tubes at one and thereof jointly to receive said fluid to pass therethrough; second means for adapting said tubes at the other end thereof jointly to deliver said fluid after passing therethrough, each said tube being formed between its ends with a loop from which two arms, constituting portions of said tube, extend respectively to said first and second means, means remote from said loops holding said arms fixed in the flowmeter, wherein each loop lies substantially wholly in a flat plane and means are provided for vibrating said loops respectively in the areas of the planes thereof while said planes remain substantially fixed and with equal frequency in opposite phases whereby coriolis forces are experienced by said arms, said arms being flexible between said loops and said first and second means and said vibrations being such as to exert vibratory torques on said loops in their respective planes, the torques having a phase-shift dependent on the mass of said fluid when passing through said tubes and sensing means responsive to said phase-shift for providing a measurement signal corresponding to the mass flow of said fluid through said tubes.

2. A coriolis mass flowmeter according to claim 1, wherein said tubes are identical in length and diameter.

3. A coriolis mass flowmeter according to claim 1, wherein each said loop, as viewed in elevation, is in the form of a rectangle with rounded corners.

4. A coriolis mass flowmeter according to claim 1, wherein each said loop, as viewed in elevation, is in the form of a circle.

5. A coriolis mass flowmeter according to claim 1, wherein each said loop is an open loop consisting of a transverse limb and two substantially parallel limbs extending respectively from the ends of said transverse limb, said two arms associated with said loop being formed to extend in opposite directions respectively from the ends of said substantially parallel limbs remote from said transverse limb.

6. A coriolis mass flowmeter according to claim 1, wherein said loops are located respectively in parallel planes.

7. A coriolis mass flowmeter according to claim 1, wherein said loops are located respectively in intersecting planes in positions such that they cross one another in the line of intersection of said planes, said vibrating means being unitary means located substantially at said line of intersection.

8. A coriolis mass flowmeter according to claim 1, wherein said vibrating means are electromagnetic means.

9. A coriolis mass flowmeter according to claim 1, wherein said vibrating means comprise spaced sensors each including a magnet mounted on one of said loops facing a search coil mounted on the other of said loops.

10. A coriolis mass flowmeter according to claim 1, wherein it includes means connecting said vibrating means and said sensing means and operative to maintain said frequency of vibration resonant with said vibratory torques.

11. A coriolis mass flowmeter according to claim 1, wherein it includes two node plates, one said node plate being mounted to bridge said tubes adjacent said first means and the second said node plate being mounted to bridge said tube adjacent said second means, said node plates being free from said means for holding said arms fixed and said means for holding said arms fixed being located to fix said arms at a first location between said first means and said one node plate and to fix said arms at a second location between said second means and said second node plate.

12. A coriolis mass flowmeter according to claim 11, wherein said node plates are arranged to maintain resonant energy between said two loops.

13. A coriolis mass flowmeter according to claim 11, wherein said node plates are arranged to reduce transmission of noise to and from the flowmeter.

14. A coriolis mass flowmeter according to claim 11, wherein said node plates are arranged to reduce bending of said tubes at said first and second locations.

* * * * *